United States Patent [19]

Masuda et al.

[11] 3,814,956

[45] June 4, 1974

[54] CONTACTLESS SWITCHING APPARATUS

[75] Inventors: Noboru Masuda, Kawaguchi; Masasi Kuroyanagi, Tokyo, both of Japan

[73] Assignee: Denki Onkyo Co., Ltd., Tokyo, Japan

[22] Filed: June 7, 1973

[21] Appl. No.: 367,825

Related U.S. Application Data

[63] Continuation-in-part of Ser. No. 256,571, May 24, 1972, abandoned.

[30] Foreign Application Priority Data

May 24, 1971 Japan ................................ 46-35398

[52] U.S. Cl. .................. 307/309, 307/242, 307/253

[51] Int. Cl. ......................................... H03k 17/04

[58] Field of Search ............ 307/308, 309, 240–242, 307/253

[56] References Cited

UNITED STATES PATENTS 3,626,349 12/1971 Hubrich ......................... 307/309 X 3,660,683 5/1972 Wangard ......................... 307/241 X

*Primary Examiner*—John Zazworsky

*Attorney, Agent, or Firm*—Armstong, Nikaido & Wegner

[57] ABSTRACT

A contactless switching apparatus, wherein a plural number of semiconductor elements having a variable resistance effect which are designed to vary the resistance value through respective actuating means are connected in parallel to the power supply, the detection circuit detects variation of the resistance value of at least one of said semiconductor elements, the power switching circuit is actuated with this detection of resistance variation to supply the current respectively to said semiconductor elements and a unit switch circuit only, the resistance value of which varies, of a plural number of unit switch circuits which respectively have the semiconductor elements.

15 Claims, 11 Drawing Figures

PATENTED JUN 4 1974 3,814,956

SHEET 1 OF 2

CONTACTLESS SWITCHING APPARATUS

This application is a continuation-in-part of application Ser. No. 256,571 filed May 24, 1972, and now abandoned.

BACKGROUND OF THE INVENTION

The present invention relates to a contactless switching apparatus to be employed mainly in portable desk type electronic computers.

Conventional contactless switches are designed so that the current is always supplied to the switching circuits regardless of push button operation.

The switching circuits employed in the desk type computers should be provided with switching circuits corresponding to a number of push buttons; accordingly, conventional contactless switches are disadvantageous because they require large amount of power.

Particularly, if the desk type computer is made as the portable type, the batteries are required as the power supply and the life of the batteries is extremely short.

The present invention provides a contactless switching apparatus from which said disadvantages are eliminated.

SUMMARY OF THE INVENTION

A contactless switching apparatus comprising: at least one DC power supply; a switching circuit having a plural number of unit switch circuits, which performs switching operation, provided with at least one semiconductor element with variable resistance effect such as, for example, a magneto-resistance effect device, thereby the semiconductor elements of said unit switch circuits are connected in parallel; a first common current limiting resistor which is connected across the control electrodes of said switching element and said power supply so that the current is supplied respectively to said control electrodes, thereby the potential difference at both ends varies when the resistance value of at least one of said semiconductor elements varies; actuating means which are provided respectively for said semiconductor elements to vary their resistance values; a detection circuit which detects variation of the potential across both ends of said first current limiting resistor when the resistance value of at least one of said semiconductor elements varies; and a power switching circuit which performs the switching according to function of said detection circuit and is connected to said semiconductor element so that the current from said power supply is supplied to the semiconductor elements through said first current limiting resistor, following the action to the detection circuit due to variation of the potential across both ends of the first current limiting resistor, wherein the current supplied from said power supply to the semiconductor elements increases when the resistance value of at least one of semiconductor elements varies and only the unit switch circuit containing a semiconductor element the resistance value of which has varied performs the switching.

BRIEF DESCRIPTION OF DRAWINGS

The present invention is illustrated in detail by the accompanying drawings whereon.

DETAILED DESCRIPTION

Figure 1:
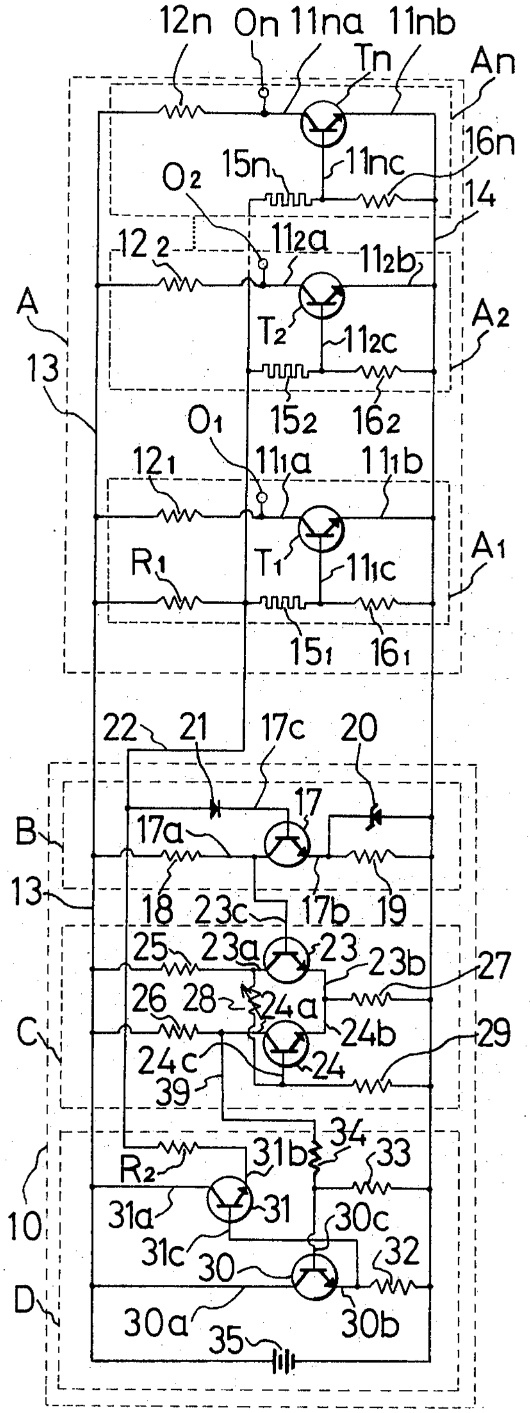
FIG. 1 is a circuit diagram of the apparatus according to the present invention.

Referring to FIG. 1, there is shown an embodiment of the circuit according to the present invention.

Switching circuit A is comprised of number n of units switch circuits $A_1$, $A_2$, - - - , $A_n$ which operate independently.

Said unit switch circuits respectively consist of switching elements such as, for example, transistors $T_1$, $T_2$, - - - , $T_n$ and bias circuits which control said transistors to the on-state or off-state. This bias circuit contains the semiconductor elements such as, for example, magneto-resistance effect devices (hereafter referred to as the "device") $15_1$, $15_2$ - - - , $15_n$, which provide variable resistance effect due to external effect without through contacts.

Said magneto-resistance effect devices are provided respectively with the actuating means which vary the resistance value of the devices.

Figure 2:
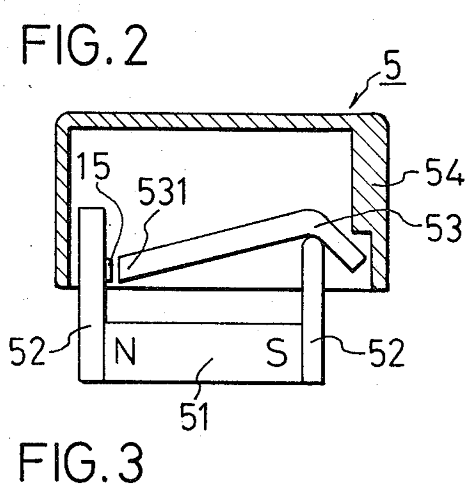
FIG. 2 is a cross sectional side view illustrating an actuating means employed in the apparatus according to the present invention.

This actuating means in the circuit shown in FIG. 1 can be designed so that the resistance value of said devices is usually high and is low when required; for example, the magnetic field is usually applied to the device and is removed when required by employing mechanism 5 as shown in FIG. 2. This mechanism is constructed so that magnetic fixed yokes 52 are oppositely arranged at both magnetic poles of magnet 51, one of which being provided with magneto-resistance effect device 15 and the other of which being provided with magnetic movable yoke 53, and free end 531 of the movable yoke is forced to approach the device or to depart from it according to rotation of said movable yoke 531. Accordingly, the push button switching mechanism can be formed by mounting push button cap 54 on the movable yoke.

Figure 11:
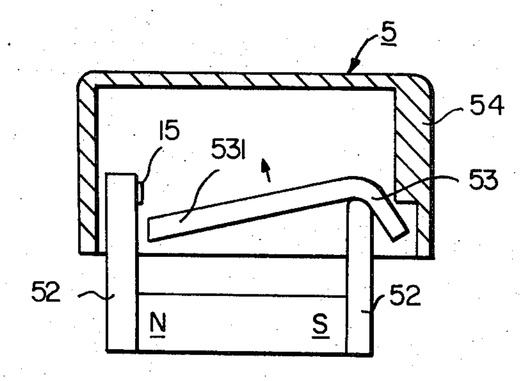
FIG. 11 is a cross-sectional side view illustrating an alternative embodiment of the actuating means employed in the apparatus according to the present invention.

Mechanism 5 is a contactless push button switch mechanism conventionally known as the prior art, and can be formed as a different construction as for example as shown in FIG. 11 if it satisfies the requirements of the resistance value of said device.

In FIG. 1, collectors $11_1a$, $11_2a$, - - - , $11_na$ of transistors $T_1$, $T_2$, - - - , $T_n$ are connected to power supply line 13 extending from power supply circuit 10 through collector load resistors $12_1$, $12_2$, - - - , $12_n$ and are provided with output terminals $0_1$, $O_2$, - - - , $O_n$, emitters $11_1b$, $11_2b$, - - - , $11_nb$ are connected to grounding line 14 extending from power supply circuit 10, and bases $11_1c$, $11_2c$, - - - , $11_nc$ are respectively connected across contactless variable resistance devices $15_1$, $15_2$, - - - , $15_n$ and fixed bias resistors $16_1$, $16_2$, - - - , $16_n$. Said fixed bias resistors are respectively connected to grounding line 14 extending from power supply circuit 10 and said devices are connected in parallel and are further connected to said power supply line 13 through single current limiting resistor $R_1$ having the specified resistance value. The devices and fixed bias resistors form respectively said bias circuits; accordingly, these bias circuits are connected in parallel and further to power supply line 13 through current limiting resistor $R_1$.

The constant of said switching circuit is set so that the base bias voltage of transistor $T_1$ rises and transistor $T_1$ functions when the key corresponding to a unit switching circuit such as, for example, unit switch circuit $A_1$ is depressed to reduce the resistance value of device $15_1$. When transistor $T_1$ functions, the overall impedance provided by current limiting resistor $R_1$ and the bias circuit parallel-connected to this resistor does not nearly vary and the voltage across both ends of current limiting resistor $R_1$ slightly varies due to variation of the resistance of device $15_1$.

Figure 10:
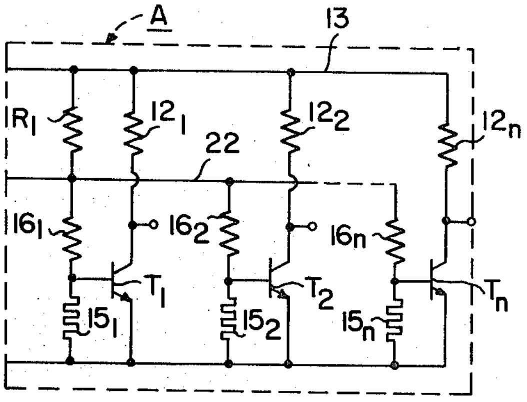
FIG. 10 is a schematic circuit diagram of an alternative embodiment of the switching circuit of the present invention.

FIG. 10 illustrates an alternate embodiment of switching circuit A in which the connection of resistors $16_1$, $16_2$, - - - , $16_n$ and devices $15_1$, $15_2$, - - - , $15_n$ have been revised.

Power supply circuit 10 is comprised of detection circuit B, waveform shaping circuit C and power supply switching circuit D.

Detection circuit B has detection transistor 17. Collector *17a* of detection transistor 17 is connected to power supply line 13 through collector load resistor 18, emitter *17b* is connected to grounding line 14 through the parallel circuit consisting of bias resistor 19 and Zener diode 20 for thermal compensation, and base 17c is connected to power feed line 22 through diode 21 so that it is connected in the forward direction from said power feed line 22 to said base. This power feed line 22 is connected between the bias circuits formed by the devices and the fixed bias resistors of said switching circuit and current limiting resistor $R_1$ and connected to power supply switching circuit D.

Said detection circuit is designed so that detection transistor 17 changes from on-state to off-state when the push button corresponding to a unit switch circuit such as, for example, unit switch circuit $A_1$ is operated and the potential difference at both ends of current limiting resistor $R_1$ becomes large as described before and detection transistor 17 changes from off-state to on-state due to function of diode 21 when the potential difference at both ends of current limiting resistor $R_1$ becomes small after said push button operation is finished.

Figure 7:
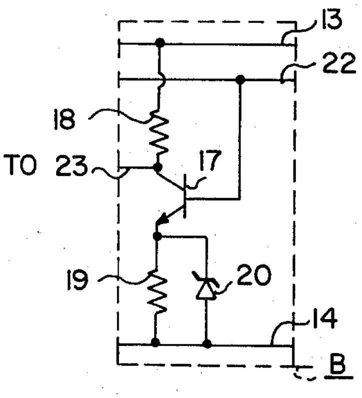
FIGS. 7–9 are schematic circuit diagrams of alternative embodiments of the detection circuit of the present invention.
Figure 8:
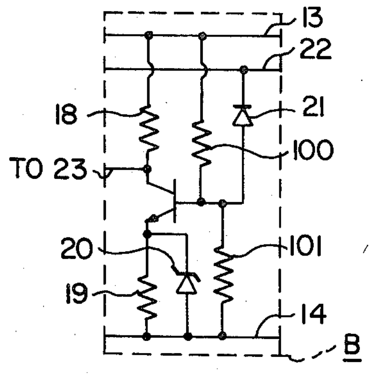
Figure 9:
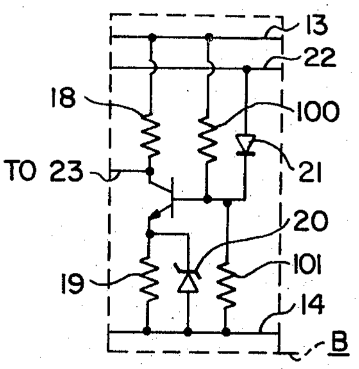

FIGS. 7–9 illustrates alternative embodiments for detection circuit B.

When a sufficiently large variation of the base potential of transistor 17 is positively obtained, diode 21 can be omitted and line 22 can be directly connected to the base of transistor 17 as illustrated.

As shown in FIG. 8, resistors 100 and 101 are additionally connected to detection circuit B. In other words, resistor 100 is connected across the base of transistor 17 and power supply line 13 and resistor 101 across base *17c* and ground line 14. Diode 21 is connected in the forward direction from base *17c* to power feed line 22. In this embodiment, the bias potential is given by resistors 100 and 101 when switch 5 is not depressed and transistor 17 is in the on-state. When switch 5 is depressed and the resistance value of device 15 becomes low, the current flows in the bias circuit of switch circuit A from power supply line 13 through first current limiting resistor $R_1$ and flows in line 22 through resistor 100 and diode 21. Accordingly, the base potential of transistor 17 drops and transistor 17 turns off. As shown in FIG. 9, bias resistors 100 and 101 of transistor 17 are connected in the same manner as shown in FIG. 8. However, diode 21 is connected in the reverse direction to that in FIG. 8. In this embodiment, the current flows in the bias circuit of switch circuit A from power supply 13 through first current limiting resistor $R_1$ and in resistor 101 through diode 21, and the current flows in resistor 101 through resistor 100; therefore, the base potential of transistor 17 is high and transistor 17 is on. When the resistance value of device 15 of the bias circuit becomes small, the current flowing in diode 21 becomes extremely small or zero and accordingly the base potential of transistor 17 drops and transistor 17 turns off.

Shaping circuit C forms the Schmidt circuit, being provided with transistors 23 and 24.

Collectors *23a* and *24a* of transistors 23 and 24 are connected to power supply line 13 through collector load resistors 25 and 26, and emitters *23b* and *24b* are connected to grounding line 14 through common bias resistor 27.

Base *23c* of transistor 23 is connected to collector *17a* of transistor 17 of detection circuit B and base *24c* of transistor 24 is connected to grounding line 14 through bias resistor 29 and to collector *23a* of transistor 23 through variable resistor 28.

This Schmidt circuit having the hysteresis characteristic is capable of shaping the waveform of signals from said detection circuit and improving the rise characteristic, and it is set so that transistor 23 becomes off-state and transistor 24 becomes on-state when transistor 17 of detection circuit B is on-state and transistor 23 becomes on-state and transistor 24 becomes off-state when transistor 17 is off-state.

Another circuit with the hysteresis characteristic such as, for example, a known flip-flop circuit can be employed as the shaping circuit.

Power supply switching circuit D has transistor 30 for conversion of impedance, switching transistor 31 and DC power supply 35.

Collector *30a* of transistor 30 is directly connected to power supply line 13, emitter *30b* is connected to grounding line 14 through resistor 32, and power supply line 13 and grounding line 14 are respectively connected to the positive and negative sides of DC power supply 35. Base *30c* of transistor 30 is connected to line 39 extending from collector *24a* of transistor 24 in shaping circuit C through base resistor 34 and is connected to grounding line 14 through bias resistor 33.

On the other hand, base *31c* of transistor 31 is connected to emitter *30b* of transistor 30, collector *31a* is directly connected to power supply line 13 and emitter *31a* is connected to power feed line 22 through second current limiting resistor $R_2$. The resistance value of second current limiting resistor $R_2$ is set so that it is smaller than that of said first current limiting resistor $R_1$.

Transistors 30 and 31 of said power supply switching circuit are off-state when Schmidt transistor 24 is on-state and are on-state when transistor 24 is off-state; thus, the power is supplied from power supply 35 to power feed line 22.

In the above circuit structure, when the push button key is not depressed, detection transistor 17 is on-state and therefore switching transistor 31 is off-state. Accordingly, the current does not flow in power feed line 22 and a small current only flows in bias circuit of switching circuit A through first current limiting resistor $R_1$. Under this condition, switching transistor $T_1$, $T_2$, - - - , $T_n$ do not function.

When the push button corresponding to a unit switch circuit such as, for example, unit switch circuit $A_1$ is depressed and the resistance value of device $\mathbf{15_1}$ reduces, the voltage across both ends of first current limiting resistor $R_1$ rises, that is, the potential across power feed line 22 and grounding line 14 falls as shown with line a in FIG. 2.

With this potential fall, transistor 17 becomes off-state, transistor 23 of Schmidt circuit C becomes on-state and transistor 24 becomes off-state. Subsequently, transistor 30 of power supply switching circuit D and then switching transistor 31 becomes on-state. With this, a large current from power supply 35 flows between collector 31a and emitter 31b of transistor 31 and flows to power feed line 22 through second current limiting resistor $R_2$.

Under this condition, since first and second current limiting resistors $R_1$ and $R_2$ are arranged in parallel relationship with power supply 35 and a large current flows in the bias current of the switching circuit, the voltage across power feed line 22 and grounding line 14 rises as shown with line b in FIG. 2. The bias potential of the switching transistor of said unit switch circuit for which the key is operated is raised up to the operating potential level, switching transistor $T_1$ becomes on-state and the output voltage varies.

If the potential of power feed line 22 becomes higher than the operating potential of detection transistor 17 of detection circuit B, transistor 17 becomes again on-state, switching transistor 31 of power switching circuit D becomes off-state, the potential of power feed line 22 reduces as shown in line c in FIG. 2, the bias potential of transistor $T_1$ of switching circuit A falls, transistor $T_1$ becomes off-state and the output voltage returns to the level before operation.

Figure 3:
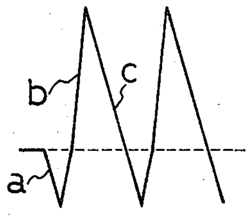
FIG. 3 is an explanatory diagram for the characteristic of the apparatus according to the present invention in which the variation of the potential difference across both ends of the bias circuits of the unit switch circuits.
Figure 4:
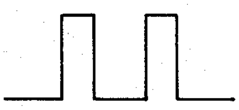
FIG. 4 is an explanatory diagram for the output characteristic of the apparatus.

The potential of power feed line 22 reduces as described in the foregoing, that is, as shown with line a in FIG. 3 and repeats said functioning. Thus, the pulse voltage waveform is continuously outputed from the unit switch circuit corresponding the key as shown in FIG. 4 while this key is being depressed.

In the circuit shown in FIG. 1, the duration of said pulses can be varied by changing the threshold potential of the transistor of Schmidt circuit through variation of the resistance value of variable resistor 28 of Schmidt circuit C.

Figure 5:
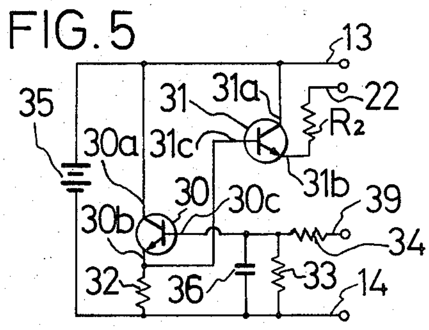
FIGS. 5 and 6 show another embodiment of a power supply switching circuit of the apparatus of the present invention.

And the pulse duration can be also varied by connecting capacitor 36 in parallel with base resistor 33 of transistor 30 of power supply switching circuit D as shown in FIG. 5 to vary the capacity value of capacitor 36.

Figure 6:
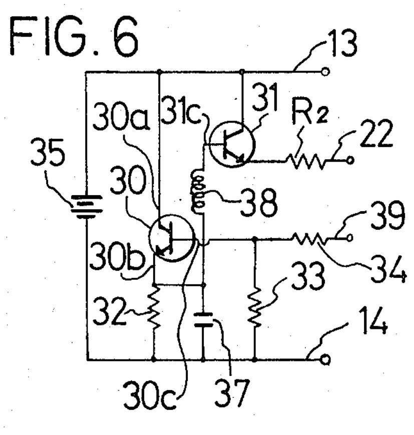

As shown in FIG. 6, if emitter 30*b* of transistor 30 of power supply switching circuit D is connected to grounding line 14 through the parallel circuit formed by resistor 32 and capacitor 37 and is connected to base 31*c* of transistor 30 through coil 38, the rise of transistor 31 is delayed by the series circuit formed by capacitor 37 and coil 38 and the rise of detection transistor 17 is also delayed. Accordingly, if the circuit shown in FIG. 6 is employed when the rise of transistor 17 is excessively early and Schmidt circuit C cannot function satisfactory, said Schmidt circuit can be functioned satisfactory.

Not only the magneto-resistance effect device but also other contactless resistance effect element such as, for example, photo-resistance effect element or pressure sensing element can be used as said semiconductor element.

In the circuit shown in FIG. 1, devices $\mathbf{15_1}$, $\mathbf{15_2}$, - - - , $\mathbf{15_n}$ of the bias circuit of each unit switch circuit can be replaced with fixed bias resistors $\mathbf{16_1}$, $\mathbf{16_2}$, - - - , $\mathbf{16_n}$, while said actuating means can be designed so that the magnetic field is not usually applied to said devices and the magnetic field is applied to said devices when the corresponding push button is depressed as desired and the resistance increases.

As known from the above description, the apparatus of the present invention is advantageous because a specified current flows in the switching circuit when the push button is depressed while a slight current flows usually and therefore the power consumption is extremely small.

The output of the switching circuit becomes the pulse wave and therefore requires less power.

The circuits of the apparatus according to the present invention can be formed with IC's or LSI's. Thus, the power consumption can be further reduced.

For these reasons, the apparatus according to the present invention is most suitable for portable desk type computers.

What is claimed is:

1. A contactless switching apparatus comprising a. at least one DC power supply;

b. a switching circuit which includes a plural number of unit switch circuits respectively comprising at least one switching element having a control electrode and at least one semiconductor element having a variable resistance, said semiconductor elements of said unit switch circuits being connected in parallel;

c. first current limiting resistor means common to said unit switch circuits, said current limiting means coupled to said control electrodes of said switching elements and said power supply to supply the current respectively to the control electrodes, whereby the potential difference across said first current limiting resistor means varies as the resistance value of at least one semiconductor element varies;

d. actuating means corresponding to said semiconductor elements to vary the resistance value of said semiconductor elements;

e. detection circuit means for detecting the variation of the potential across both ends of said first current limiting resistor means due to variation of the resistance value of at least one of said semiconductor elements; and f. power supply switching circuit means for switching in response to said detection circuit means, said power supply switching circuit connected to said semiconductor elements such that a greater current from said power supply is supplied to said semiconductor elements when said detection circuit detects a variation of the potential across said first current limiting resistor means wherein the current supplied from said power supply switching circuit means to said semiconductor elements increases when the resistance of at least one of said semiconductor elements varies.

2. An apparatus according to claim 1, wherein said switching elements are transistors.

3. An apparatus according to claim 2, including a bias circuit for controlling the operating potential of each said unit switch circuits, said bias circuits including said semiconductor elements.

4. An apparatus according to claim 3, wherein said bias circuits are formed as a series circuits each series circuit comprising said semiconductor element and at least one fixed resistor wherein the control electrode of each switching element is connected between the semiconductor element and the fixed resistor.

5. An apparatus according to claim 4, wherein each semiconductor element is connected to said first current limiting resistor means.

6. An apparatus according to claim 4, wherein one end of each fixed resistor is connected to said first current limiting resistor means.

7. An apparatus according to claim 3, wherein the resistance value of said semiconductor element varies when said actuating means is operated and the voltage across said first current limiting resistor means increases whereby said detection circuit detects the increase of the potential across said first current limiting resistor means.

8. An apparatus according to claim 7, wherein the current from said power supply switching circuit means is supplied to said bias circuit through a second current limiting resistor, said first and second current limiting resistors being arranged in a parallel relationship when the current is supplied such that when the potential across said first current limiting resistor decreases, said detection circuit means detects the decrease in potential and said power supply switching circuit means stops supplying the current to said bias circuits whereby the current is intermittently supplied from the power supply switching circuit means to the bias circuits, thus causing the unit switch circuits, in which the resistance value varies, to generate pulses.

9. An apparatus according to claim 1, further including a waveform shaping circuit having a hysteresis characteristic which improves the rise time of the output waveform of the detection circuit through shaping is connected between said detection circuit means and power supply switching circuit means.

10. An apparatus according to claim 6, wherein a Schmitt circuit is employed as said waveform shaping circuit.

11. An apparatus according to claim 1, wherein the resistance value of said semiconductors is normally low and becomes high when said actuating means is operated.

12. An apparatus according to claim 1, wherein the resistance value of said semiconductor elements is normally high and becomes low when said actuating means is operated.

13. An apparatus according to claim 1, wherein said semiconductor element is a magneto-resistance device.

14. An apparatus according to claim 13, wherein a magnetic field is applied to said magneto-resistance device when said actuating means is operated and is not applied when said actuating means is not operated.

15. An apparatus according to claim 13, wherein a magnetic field is applied to said magneto-resistance device when said actuating means is not operated and is not applied when said actuating means is operated.

* * * * *